Patented June 3, 1947

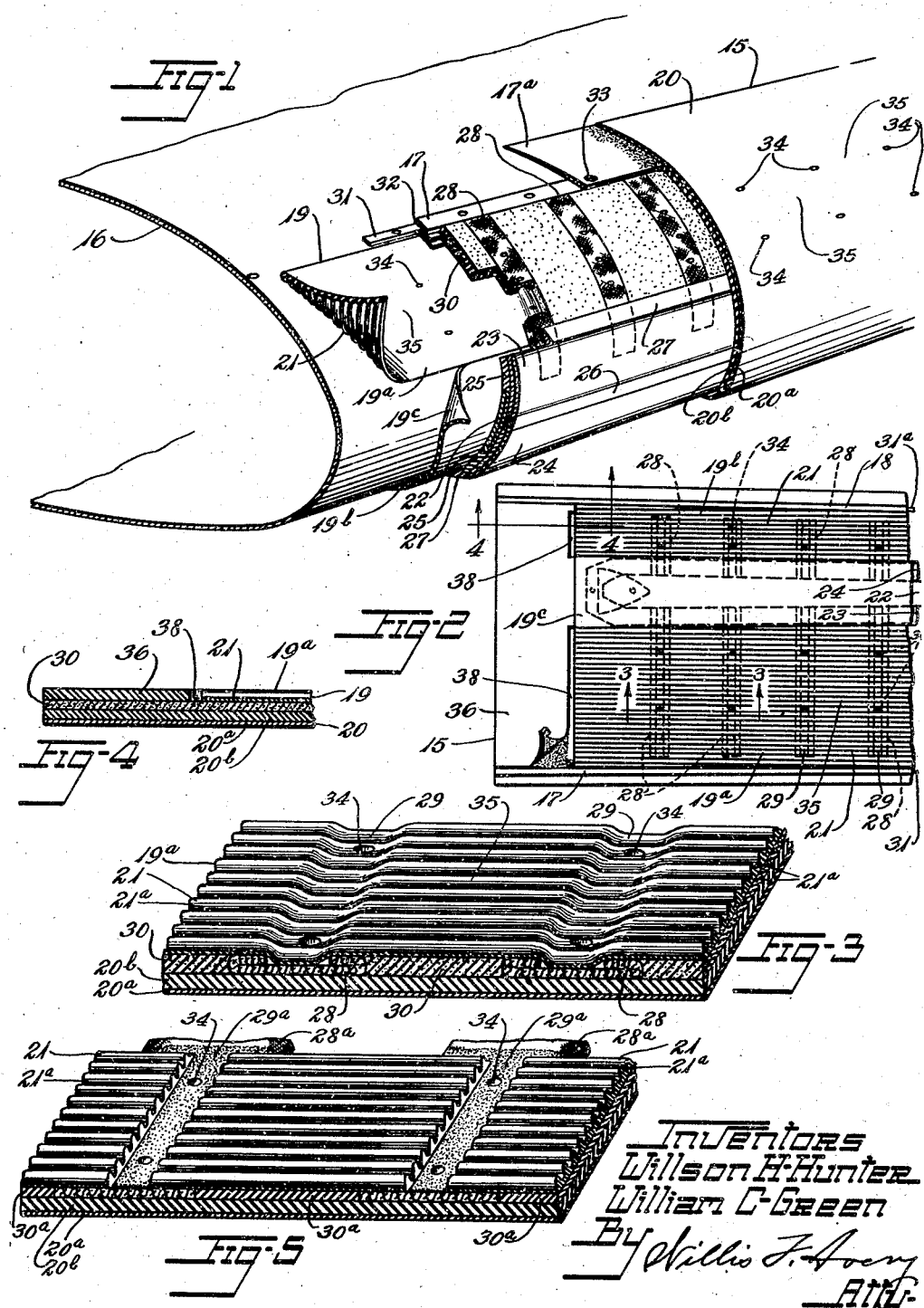

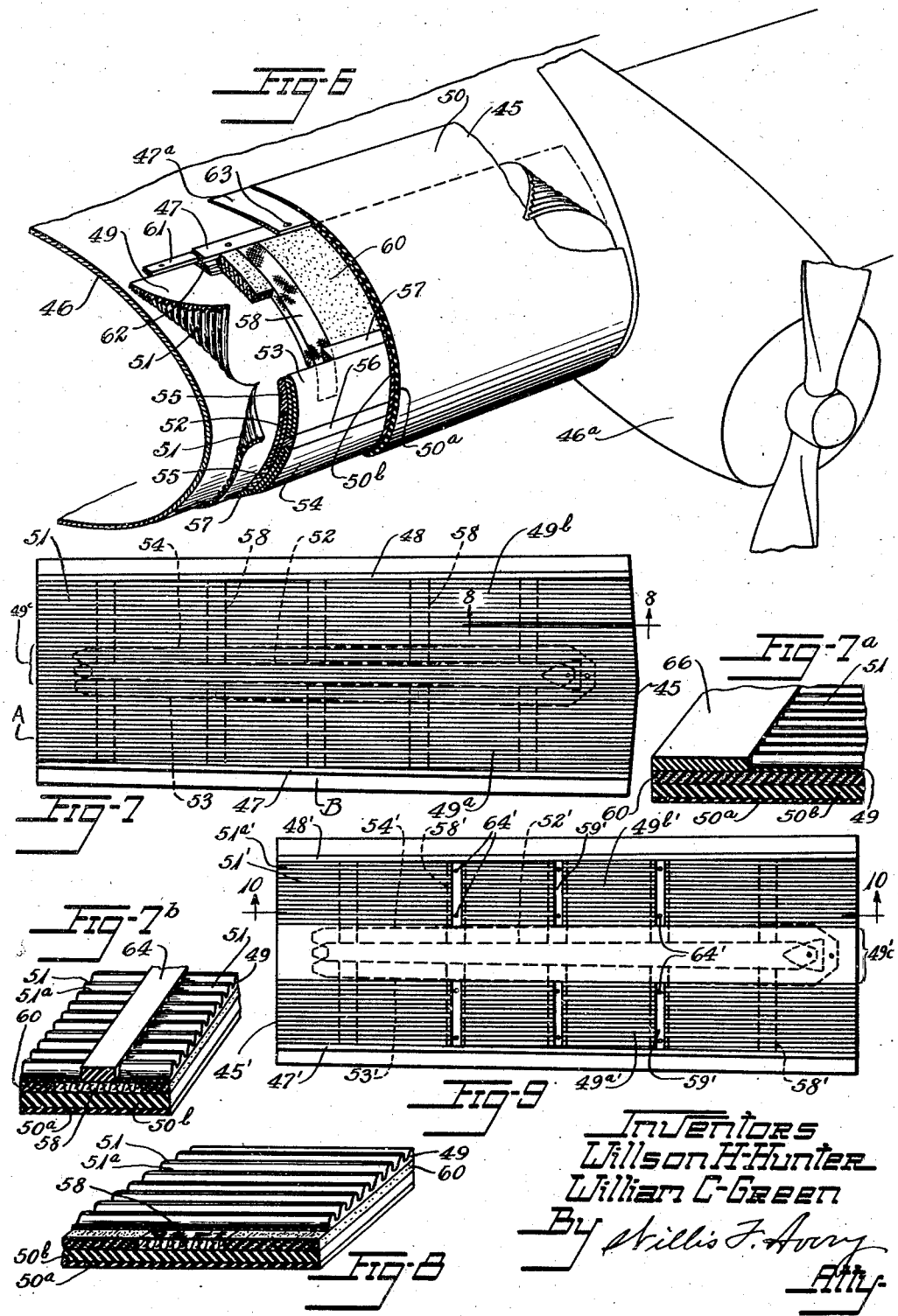

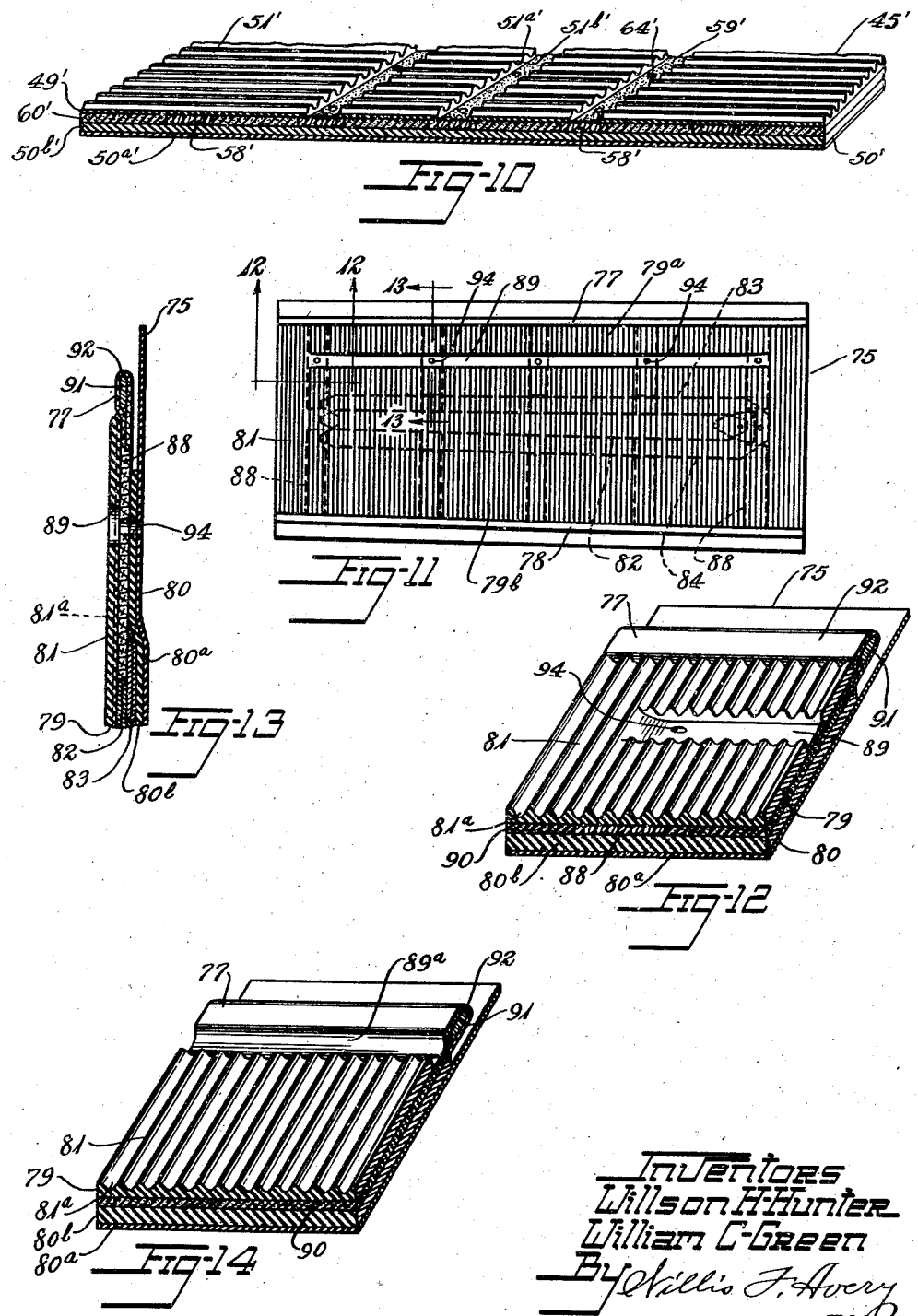

2,421,621

UNITED STATES PATENT OFFICE 2,421,621

ICE REMOVING COVERING FOR AIRCRAFT

Willson H. Hunter and William C. Green, Akron, Ohio, assignors to The B. F. Goodrich Company, New York, N. Y., a corporation of New York Application April 10, 1943, Serial No. 482,536

17 Claims. (Cl. 244—134)

This invention relates to ice removing coverings for the surfaces of structures such, for example, as aircraft and other vehicles, and is especially useful in its application to inflatable protective coverings for preventing accumulation of ice on the leading edge of wings and other airfoils.

An airfoil, for example a wing, of an aircraft in flight may be functioning under cruising, diving, climbing, and stalling conditions, respectively, with corresponding variation in the aerodynamic forces at the leading edge of the airfoil and especially in the area of negative pressure produced by the airfoil. When the wing is provided with an inflatable protective covering of flexible material, such, for example, as resilient rubber-like material, this variation in aerodynamic forces tends at times to cause portions of the covering to lift away or bulge objectionably from the wing surface.

The expedient of venting holes alone in a covering, while itself considerably improving the action of the covering under air flow across it, has been found not to give the most desirable action under all conditions. For example, it has been found that in some cases the areas centrally between venting holes have not received the fully effective venting obtained in the regions nearer the venting holes owing to the remoteness of such areas from the holes and restrictions to the flow of air. Also, in conditions of inflation where it is desired that such areas slide along and lift readily from the airfoil surface, the frictional resistance has tended to retard the relative movement. Efforts to maintain effective ventilation between the covering and the airfoil surface in such intermediate areas, as, for example, by the expedient of knurling the under face of the covering and putting all spaces between the projections of such knurling in direct communication with one another and directly with the venting holes, have not been wholly satisfactory in the respect of venting action owing to the undesirable circulation of air that results among such spaces.

The problem of obtaining most effective venting in all cases is aggravated by the desirability of providing, in some cases, spanwise lines of venting holes separated in the chord-wise direction in which event all such holes can not be exposed to the same degree of low air pressure at all times. If an area beneath the covering is in communication directly by the shortest possible path with two such venting holes spaced-apart in the chord-wise direction, undesirable circulation of air in such area is promoted. In accordance with the invention provision is made for avoiding undesirable circulation in such intermediate areas and confining what circulation must occur to restricted venting zones which may include the positions of the venting holes.

By the present invention provision is made for the most effective flow of air from an area spaced from a venting zone to such zone whether communication of such zone with low air pressure is effected at but a single spanwise station or at two or more such stations spaced-apart in the chord-wise direction. The invention further makes possible effective support of the under face of the covering upon the airfoil surface while at the same time frictional resistance that might retard desired relative movement of the covering and airfoil during inflating action is minimized.

Objects of the invention are to provide for compelling the flow of air along determinate paths beneath the covering in accordance with the individual requirements of the airfoil to effect the best venting action, and especially to provide for minimizing objectionable circulation of air in areas at the underside of the covering while providing for effective communication of such areas with a zone or zones of lower pressure; to provide for conducting the air along paths, preferably rectilinear, which are direct as possible consistent with obtaining the desired pressure condition in said areas and a minimum of objectionable circulation.

Other objects of the invention are to provide for promoting equalization of the air pressure along venting channels, preferably rectilinear, extending spanwise or extending chord-wise of the covering with respect to the outer air pressure, to provide for ease of movement between the covering and the airfoil, and to provide for venting the covering at an end or ends thereof.

These and other objects and advantages of the invention will be apparent from the following description.

In the accompanying drawings, which form a part of this specification, and in which like numerals are employed to designate like parts throughout the same, Fig. 1 is a perspective view showing a protective covering mounted upon an aircraft wing, and constructed in accordance with and embodying the invention in one of its forms, parts being broken away and in section, Fig. 2 is a bottom plan view of the covering of Fig. 1 before its application to the wing, parts being broken away, Fig. 3 is a sectional and perspective bottom view in an enlarged scale taken along line 3—3 of Fig. 2, Fig. 4 is a sectional view taken along line 4—4 of Fig. 2, Fig. 5 is a view like Fig. 3, but showing a modified construction, Fig. 6 is a perspective view of a modified construction of the protective covering as applied to an aircraft wing adjacent an engine nacelle, parts being broken away and in section, Fig. 7 is a bottom plan view of the covering shown in Fig. 6 before its application to the aircraft wing, Fig. 7A is a sectional and perspective bottom view showing an alternative construction at the end region A of Fig. 7, Fig. 7B is a sectional and perspective bottom view showing an alternative construction at the region B of Fig. 7, Fig. 8 is a sectional and perspective bottom view taken along line 8—8 of Fig. 7, Fig. 9 is a bottom plan view of another modified construction, Fig. 10 is a sectional and perspective bottom view taken along line 10—10 of Fig. 9, Fig. 11 is a bottom plan view showing a further modification, Fig. 12 is a sectional and perspective bottom view on an enlarged scale taken along line 12—12 of Fig. 11, Fig. 13 is a sectional view on an enlarged scale taken along line 13—13 of Fig. 11, and Fig. 14 is a view like Fig. 12 but showing an alternative construction.

The foregoing and other objects are attained in one form of the invention by the provision in an area, preferably rectangular or generally so, at the inner face of the covering of a multiplicity of substantially consecutive rectilinear ribs or lands extending spanwise throughout the extent of the area and defining rectilinear venting channels, each relatively small in cross-section as compared to its length and each opening at a margin of said area into a substantially unidirectional chord-wise manifolding zone, also preferably rectilinear, which zone is disposed intermediate the ends of the covering or at an end of the covering, the channels being in communication with low pressure air. This form of the invention is useful especially where the manifolding zone is in communication with low pressure air at several chord-wise stations where pressure conditions are not the same.

In another form of the invention good results for some types of airfoils are obtained by a chordwise disposition of the ribs and included channels which open into a manifolding zone extending spanwise, the paths of flow being preferably rectilinear.

In the embodiment shown in Fig. 1, an inflatable protective covering 15 of elastic construction is mounted upon an airfoil 16, such, for example, as an aircraft wing, the covering being, preferably, in a stretched condition chordwise of the wing and secured to the wing surface or its internal structure along upper and lower attaching margins 17 and 18 extending spanwise of the wing. Metal fairing strips 17a may be provided at the attaching margins of the covering 15. End margins 36 and the upper and lower attaching margins 17 and 18 of the covering are adhered to the airfoil 16 as by a suitable adhesive, such, for example, as rubber cement, and the attaching margins 17 and 18 are sealed by a clamping action of the fairing strips 17a and 18a.

The protective covering 15 includes inner and outer layers 19 and 20 of flexible material such, for example, as resilient rubber or other rubber-like material. The inner layer 19 comprises a single ply having a plurality of preferably, as shown especially in Figs. 1 to 5, a multiplicity of substantially consecutive and uniformly spaced-apart rectilinear lands or rib elements 21 on the corrugated or striated inner face at upper and lower stretchable portions 19a and 19b of the covering and having a smooth inner face at a distortable portion 19c of the covering, while the outer layer 20 comprises two plies 20a and 20b and having a smooth outer face. The covering also includes a plurality of inflatable tubes 22 to 24 preferably of resilient rubber or other rubber-like material which may be reinforced as by an elastic fabric, the tubes being sandwiched between the inner and outer layers 19 and 20, as shown for example in Fig. 1, and extending spanwise along the covering in the distortable portion 19c. In the arrangement shown the underlying tube 22 overlaps the tubes 23 and 24, but any desired arrangement of the tubes may be used. Filler elements 25 to 27 of rubber-like material may be provided at the margins of the tubes.

Stretchable reinforcing tapes 28 extending chordwise are positioned at spanwise intervals along the covering 15 for providing additional tear resistance to the structure and for providing for chordwise-extending rectilinear venting grooves 29, and rubber filler strips 30 are positioned between the margins of the tapes 28 in imperforate generally rectangular areas defined by the tapes. The reinforcing tapes 28 extend, desirably, to the margins of the inflatable tube 22 but may extend continuously across the covering 15 between the attaching margins 17 and 18.

The upper and lower attaching margins 17 and 18 of the covering 15 may be reinforced by beads 31 and 31a of stiff material, such, for example, as wire, and by strip elements 32 of fabric or other suitable material. The covering 15 may be attached to the wing 16 at the upper and lower margins by screws 33 passing through the fairing strip, the strip element, and the bead and into the structure of the wing; and these margins are sealed against air leakage by the clamping action of the fairing strip. End margins 36 of the covering having a smooth inner face are preferably adhered to the wing as by a suitable adhesive, such, for example, as rubber cement. The rubber and fabric parts of the covering are preferably united as a unit by vulcanization.

Apertures or venting holes 34 in the stretchable portions 19a and 19b of the covering and extending therethrough in the venting grooves 29 at the reinforcing tapes 28 are provided for venting the space beneath the covering 15. The apertures are disposed along lines spanwise of the airfoil at corresponding chord-wise positions, adjacent holes along a spanwise line being exposed to the same or nearly the same conditions of low pressure air. In the construction shown in Figs. 1 and 2, two venting holes 34 are provided in each reinforcing tape 28 in the upper stretchable portion 19a, and a single venting hole is provided in the lower stretchable portion 19b, the tube area 19c separating the upper holes from the lower holes. However, other suitable combinations of the venting holes with the reinforcing tapes may be provided. For example, a greater or lesser number of venting holes may be in the upper portion 19a in each tape 28, or a venting hole may be in alternate tapes in the lower portion 19b, or there may even be no venting holes in the lower portion 19b.

In the operation of the protective covering 15 when installed upon an aircraft wing 16 the inflatable tubes 22, 23, 24, are inflated and deflated rapidly with a rest period between inflations. Inflation of the tubes moves the inner face of the covering at the stretchable portions outwardly from the wing but upon the deflation of the tubes the inner face returns against the wing. Under both inflation and deflation and also in the deflated condition the construction herein described facilitates the performance.

It is desirable that the path of the flow of air between the respective venting holes 34 in each reinforcing tape 28 in the upper stretchable portion 19a, for example, be in a rectilinear chordwise line for minimum length of the path and thereby minimum loss due to pressure drop. The flow of air in all directions and in non-rectilinear paths between the venting holes is not permitted since the walls of the venting grooves 29 restrict the flow of air to a rectilinearly determinate path in a chord-wise direction; hence the flow of air will not exist in many directions between the venting holes in the space between the covering 15 and the wing 16. Flow from each spot in the channeled area is along a determinate path, rather than a number of paths of different length, and variable configuration of pressures and objectionable circulation under the covering is avoided.

The chord-wise extending manifolding zones or venting grooves 29 are provided for interconnecting the venting holes 34 and for distributing the venting action in a rectilinear line fore and aft, preferably along the reinforcing tapes 28, whereby a plurality of spaced-apart chord-wise extending venting zones 29 are provided at spanwise intervals along the covering 15. It is desirable that the venting holes 34 at the reinforcing tapes 28 be disposed centrally along the venting grooves 29 for assuring the passage of air through the venting holes while eliminating any check valve action of the margins of the venting holes and for assuring the flow of air in a rectilinear and chordwise path with a minimum of pressure drop along the manifolding zones.

In the functioning of the venting holes 34 and the chordwise-extending venting grooves 29, the pressure at each of the spaced-apart venting holes 34 in each of the venting grooves 29 in the stretchable portion 19a, for example, may be different in which case some air will flow by virtue of the pressure differential between these two venting holes in each venting groove, without however promoting objectionable circulation in the area between adjacent venting grooves, because the pressures in adjacent grooves 29 are substantially the same when the venting holes 34 are positioned along lines spanwise of the covering at corresponding chord-wise points. The rectilinear and chord-wise path provided by the venting grooves 29 promotes rapidly a condition of equilibrium in the flow of air between the venting holes during changes in flight conditions of the wing.

The multiplicity of small coextensive lands 21 extend spanwise along the covering in imperforate areas 35 defined between the spaced-apart venting grooves 29 and terminate at the latter, while coextensive venting channels 21a are in communication with the manifolding zones or venting grooves 29 whereby equalization of the air pressures along the venting channels in the areas between the grooves is promoted with respect to the air pressures in the venting grooves. The contact of the coextensive lands 21 with the airfoil 16 provides for total confinement of each of the spanwise coextensive channels 21a in the imperforate areas 35 except at the ends of the channels communicating with the chordwise venting grooves 29 or manifolding zones.

The air pressure in each spanwise channel may be slightly different from the air pressure in each adjacent spanwise channel due to the changing pressures along the chordwise venting grooves 29. However, there is a minimum flow of air along the spanwise channels from venting groove to venting groove because substantially the same air pressure exists at each end of the spanwise channels, when corresponding chord-wise positions are used for the apertures or venting holes 34 in adjacent venting grooves.

The outer air pressure at the venting holes 34 in the reinforcing tapes 28 changes in accordance with the changes in flight conditions of the wing, and the air pressures along the venting channels 21a and the manifolding zones or venting grooves 29 change rapidly and correspondingly, and quickly attain a new state of equilibrium, while the quantity of air in each venting channel varies to suit the new pressure conditions at each end thereof in communication with the venting grooves. It is desirable for optimum venting action that the upper and lower attaching margins 17 and 18 and the respective end margins 36 of the covering be sealed against the leakage of air therethrough, and that leakage of air from within the wing to the space under the covering be prevented for avoiding objectionable bulging of the covering and for obtaining desirable pressure conditions under the covering. Selection of the locations of venting holes along lines spanwise of the covering at corresponding chord-wise positions can thereby be made without complications resulting from such leakage of air.

Preferably, chord-wise-extending ducts 38 closed at each end, are provided in the stretchable portions 19a and 19b at the end margins 36 as shown in Figs. 2 and 4 and the venting channels 21a are in communication with the ducts 38 for facilitating the venting action up to positions near the ends of the covering 15.

In addition to promoting equalization of the pressures in the rectangular areas under the covering with respect to the outer air pressures for preventing objectionable bulging of the covering and rapidly promoting a state of equilibrium of the pressures under the covering during changing flight conditions, the flow of air along determinate paths beneath the covering together with the absence of detrimental spanwise flow of air from venting groove to venting groove also reduces or prevents the entrance of harmful moisture and oil to the space between the protective covering and the wing.

Additional advantages of this construction are lesser frictional forces between the inner face of the covering and the wing by virtue of the lesser bearing area of the multiplicity of small rib elements against the wing, as compared with a smooth inner face at the stretchable portion of the covering, and the provision of an effective reservoir on the inner face for lubricants, such, for example, as soapstone or talc, by virtue of the venting channels' storage capacity. Also, the restriction of chord-wise communication between the spanwise channels in the areas between the venting grooves or manifolding zones minimizes undesirable flow of air generally at the inner face of the covering 15 and prevents objectionable suction of the lubricant from beneath the covering through the venting holes.

The provision of the multiplicity of small, closely-spaced lands or rib elements, rather than a few large and widely-spaced lands, especially in a thin structure, has the advantage of promoting uniformity of support of the covering against the airfoil throughout the extent of the ribbed area, with the resulting advantage of producing evenness of the outer aerodynamic surface when the covering is against the airfoil, despite the presence of the non-supporting spaces at the inner face of the covering. Owing to the fact that successive venting channels are closely spaced, the relatively thin portions of the covering at such channels, which have greater stretchability than the intervening, thicker rib portions, effectively cooperate with one another in their loosening action upon surface ice, so that no considerable extent of ice will remain unaffected by the ice-loosening action of such portions of greater stretchability during inflation of the covering. Also, in this ice-loosening action under the increased stretch of inflation, these portions of greater stretchability tend to dip slightly at the surface as compared to the adjacent rib areas owing to the greater contraction in thickness resulting from their greater stretch, which dipping action further increases the effectiveness of ice-loosening action, and upon deflation of the covering and consequent reduction of the stretch, the dipped condition recedes to make for evenness of the outer surface when the covering is against the air foil, which is advantageous aerodynamically.

The modified construction shown in Fig. 5 differs from that shown in Fig. 3 with respect to the manner of providing the chord-wise venting grooves. In Fig. 5 a portion of the inner layer 19 is cut-away along each chord-wise-extending reinforcing tape 28a for providing venting grooves 29a, each of the tapes having, desirably, a thin rubber coating on the exterior face for providing a smooth surface along the venting groove, and the opposite margins of the tapes 28a are not folded over like those of the tapes 28. Thin rubber sheet filler strips 30a of substantially the same thickness as the reinforcing tapes are positioned between the margins of adjacent tapes 28a. Venting holes 34 extend through the covering in the venting grooves 29a, and the ends of the venting channels 21a are open at the venting grooves 29a.

For some applications of protective coverings, the modified construction 45 illustrated in Figs. 6 and 7 is desirable and is similar to the covering 15 shown in Figs. 1 and 2 in many of its aspects but differs in that no apertures or venting holes through the covering and no chord-wise-extending venting grooves are utilized in the flexible structure 45, the chordwise venting being provided by a venting zone at the end of the covering. The inflatable protective covering 45 is mounted, preferably, in a stretched condition chord-wise of the wing 46 and secured thereto along the upper and lower attaching margins 47 and 48 extending spanwise of the wing, fairing strips 47a being provided at the attaching margins.

The covering 45 includes inner and outer layers 49 and 50 of resilient rubber or other rubber-like material. The inner layer 49 comprises a single ply having a multiplicity of spaced-apart rectilinear and coextensive lands 51 or rib elements on the inner face including upper and lower stretchable portions 49a and 49b and a distortable portion 49c of the covering. The outer layer 50 comprises two plies 50a and 50b and having a smooth outer face. A plurality of inflatable tubes 52 and 54, preferably of resilient rubber or other rubber-like material desirably reinforced by an elastic fabric, are sandwiched between the inner and outer layers 49 and 50 and extend spanwise along the covering in the distortable portion 49c. The tube 52 underlies tubes 53 and 54, but other desired arrangements of the tubes may be used. Suitable rubber filler elements 55 to 57 being provided at the margins of the tubes. Stretchable reinforcing tapes 58 extending chordwise may be positioned at spanwise intervals along the covering for providing additional tear resistance to the structure. These tapes 58 extend to the margins of the tube 52 but, if desired, may extend continuously between the attaching margins 47 and 48. Sponge rubber or rubber sheet filler strips 60 may be positioned between the margins of the tapes 58 in the imperforate rectangular areas of the stretchable portions 49a and 49b. The upper and lower attaching margins 47 and 48 of the coverings 45 may be reinforced by beads 61 of suitable stiff material and by fabric strip elements 62. The covering may be attached to the wing 46 by screws 63 passing through the fairing strip, the strip element and the bead and into the wing 46. The rubber and fabric parts of the covering 45 are preferably united as a unit by vulcanization.

The spaced-apart rectilinear and coextensive lands or rib elements 51 extend, desirably, spanwise from end to end in the rectangular area occupying in this case the entire inner face of the covering, as shown in Fig. 7, defining spaced-apart rectilinear and coextensive venting channels 51a extending spanwise and being open at their ends for communicating with the outer air. The rib elements 51 may also be disposed only in the imperforate areas of the upper and lower stretchable portions 49a and 49b between the attaching margins 47 and 48 and the outer margins of the tubes 53 and 54.

The venting channels 51a are totally confined throughout their extent except at the ends of the covering 45 by virtue of the contact of the rib elements with the wing 46; hence chordwise communication between adjacent venting channels is prevented thereby promoting equalization of the air pressure along the spanwise channels with respect to the outer air pressure at the ends of the covering. Generally, for protective coverings of short spanwise extent, the outer air pressure at each end is substantially the same thus minimizing flow of air along the venting channels, and the air pressures in the respective venting channels spanwise along the covering correspond substantially to the respective outer air pressures around the profile of the wing at the ends of the covering.

However, for some applications, the protective covering 45 may be of such spanwise extent that the outer air pressures at the ends of the covering are appreciably different, and because of this pressure differential undue flow of air through venting channels may occur together with variable pressures spanwise along the venting channels. To the end of preventing such undesirable flow of air, a chordwise-extending partitioning element 64 of resilient rubber-like material having a smooth or a chord-wise ribbed surface adjacent the wing may be provided at the region B of Fig. 7 and as shown especially in Fig. 7B.

In this arrangement the venting channels 51a terminate at the partitioning element 64 but are open at the ends of the covering; thus the inner face of the covering is divided, desirably, into substantially equal portions, each portion having a spanwise end venting action through the channels 51a responsive to the outer air pressures at the venting zone at its end of the covering. This promotes equalization of the air pressures along the channels in each portion with respect to the outer air pressures at the respective ends of the covering. With changes in flight conditions, air will enter some of the channels in accordance with changes in pressure distribution at the manifolding or venting zones at the ends of the covering, and a new state of equilibrium of pressure in each portion of the covering will be reached rapidly.

It may be desirable for some applications to provide venting of the covering at one end only in order to exclude the entrance of water, for example, or to utilize the advantages of interference effects at one end only, especially when the covering is of short spanwise extent, and to this end the arrangement shown in Fig. 7 may be modified at the end region A, for example, as shown especially in Fig. 7A. The spaced-apart rectilinear lands or rib elements 51 terminate short of the end A at a chordwise-extending sealing strip 66 of rubber-like material having a smooth outer surface. The upper and lower attaching margins 47 and 48 and the marginal sealing strips 66 are adhered to the wing as by a suitable adhesive like rubber cement and the margins 47 and 48 may be sealed by a clamping action of the fairing strips for preventing leakage of air therethrough. Since the venting channels 51a defined by the rib elements 51 are open to the outer air pressures at the manifolding or venting zone at the end opposite end A, the end venting action described hereinabove will occur only from the open end with a minimum circulation of air beneath the covering thereby preventing objectionable bulging.

The construction shown in Figs. 6, 7, 7A and 7B facilitate selection of a covering which will operate effectively at the desired location upon the leading edge of the airfoil, especially when advantage is taken of pressure conditions due to the interference effects on air flow at the junctions between parts of the aircraft, such, for example, as between the fuselage and the wing, the wing and engine nacelle 46a, and the fuselage and fin or stabilizer. These interference effects often cause greater velocities of flow of air and hence greater negative pressures than are present around the profile of the airfoil at a distance from the regions of intersection of the airfoil and the fuselage or engine nacelle, for example.

The greater negative pressures resulting spanwise along the venting channels 51a from disposing the end or ends of the covering at the regions of interference effects may be of material assistance in obtaining the desired pressure condition under the covering. A further advantage is obtained for the modified covering shown in Fig. 7A, when, for example, the open end of the covering 45 is at the junction of the fuselage and vertical fin, in that the entrance of water, oil and other foreign material beneath the covering is prevented effectively during the venting action of the venting channels. Special treatment of the open end or ends of the covering 45, as is shown especially in Fig. 7 at the end opposite end A may be made for securing the best venting action for prevailing local air flow conditions, such, for example, as shaping the end or ends in a manner to provide for an aspirating effect at the venting channels.

In the operation of the protective covering 45 in its deflated condition each spanwise venting channel 51a transmits along the covering the outer air pressure at the position of the channel on the profile of the wing and at the end or ends of the covering, whereby equalization of the air pressure along the channel is promoted with respect to the outer air pressure thus preventing effectively objectionable bulging of the covering. As flight conditions alter the pressure distribution at the end or ends of the covering, flow of air occurs and causes the new pressure distribution to be established rapidly along the venting channels, during which venting action air is exhausted from some of the channels while air is drawn into the other channels. Thus the covering 45 is vented effectively and objectionable bulging is prevented during the changes in air pressures around the leading edge of the airfoil.

The modified construction 45' shown in Figs. 9 and 10 is especially suitable for applications where the covering is of such spanwise extent that an appreciable pressure differential exists between the ends of the covering. The arrangement is like the covering 45 in some of its aspects and includes inner and outer layers 49', 50', inflatable tubes 52', 53', 54' sandwiched between the layers 49', 50' and extending spanwise along a distortable portion 49c' of the covering 45', upper and lower attaching margins 47', 48' between which margins and the margins of the tube 52' are disposed stretchable reinforcing tapes 58' extending chordwise at spanwise intervals, and filler strips 60' of rubber-like material between the margins of the tapes 58'. The distortable portion 49c' has a smooth inner surface for disposition against the airfoil.

In the imperforate and generally rectangular areas of stretchable portions 49a' and 49b' at the inner face of the covering are provided a multiplicity of spaced-apart coextensive lands or rib elements 51', preferably rectilinear, extending spanwise along the covering and defining a multiplicity of spaced-apart coextensive venting channels 51a' open at the ends of the covering and open at one or more chordwise-extending manifolding zones or venting grooves 59', preferably rectilinear, for communication with the outer air pressures through the openings of the channels at the ends of the covering and through spaced-apart apertures or venting holes 64' in the covering at the venting grooves 59'. The venting grooves 59' extend along the chordwise reinforcing tapes 58' which may have a thin rubber coating for providing a smooth outer surface and which are positioned intermediate the ends and at the central region of the covering as shown in Fig. 9. The venting holes 64' are disposed centrally of the venting grooves 59' and disposed along spanwise lines at corresponding chordwise positions. Since the spaced-apart lands or rib elements 51' are coextensive with the generally rectangular and imperforate areas of the stretchable portions 49a' and 49b', they provide by contact with the airfoil for total confinement of each of the venting channels 51a' except at the ends of the covering and at their ends in communication with the manifolding zones or venting grooves 59' and provide for promoting equalization of the air pressures along the spanwise channels with respect to the outer air pressures at the ends of the covering and at the venting holes 64'.

In the operation of the protective covering 45' in the deflated condition when the inner face of the covering is against the airfoil, the outer air pressures at the ends of the covering around the profile of the airfoil are transmitted toward the central region of the covering along the spanwise channels 51a while the air pressures existing in the chordwise manifolding zones are transmitted through the venting channels spanwise along the covering with minimum flow of air. In this manner equalization of air pressures under the covering with respect to the outer air pressures is promoted and objectionable bulging of the covering is prevented. As flight conditions of the wing change causing changes in the outer air pressures at the ends of the covering and at the venting holes, the air pressures along the spanwise channels and the chordwise venting grooves correspondingly change and rapidly reach a new state of equilibrium.

The modified construction 75 shown in Fig. 11 is desirable for applications to airfoils, when spanwise venting of the covering is preferably at the region of the attaching margins. As illustrated in Figs. 11 to 14, the covering 75 having upper and lower attaching margins 77 and 78 includes inner and outer layers 79 and 80 (80a and 80b) of resilient rubber or other rubber-like material and a plurality of spanwise-extending inflatable tubes 82, 83, 84 of resilient rubber material preferably reinforced with suitable elastic fabric, the tubes being sandwiched between the inner and outer layers 79 and 80. The tube 82 underlies the tubes 83 and 84 like the arrangement shown in Fig. 1 but any desired arrangement may be used. The inner layer 79 has a plurality of spaced-apart chordwise-extending rectilinear lands or rib elements 81 throughout the imperforate and generally rectangular area or areas of the entire inner surface for disposition against the airfoil and for defining a plurality of spaced-apart chordwise-extending rectilinear venting channels 81a extending between the margins 77 and 78 of the covering. Stretchable reinforcing tapes 88 extend chordwise between the upper and lower attaching margins 77 and 78 at spaced-apart spanwise positions, preferably terminating at the margins of the tube 82 but may extend continuously across the tubes. Rubber filler strips 90 are provided between the margins of the tapes 88. A bead 91 enclosed in a fabric strip element 92 is provided at each of the attaching margins 77 and 78 which margins are secured to the wing as by spaced-apart screws extending therethrough and sealed against leakage of air by a suitable adhesive in the manner described hereinabove. The rubber and fabric parts of the covering 75 are united as a unit by vulcanization.

The chordwise rectilinear lands or rib elements 81 in the generally rectangular areas of the inner layer 79 are disposed, preferably, to the ends of the covering 75 whereby the leakage of air at the margins of these ends is prevented by the contact of the ribs with the airfoil. The chordwise venting channels 81a defined by the rib elements 81 are in communication with a spanwise-extending manifolding or venting zone or groove 89 for promoting equalization of the air pressures along the venting channels with respect to the air pressures along the groove. The venting groove 89 is disposed, preferably, in the upper stretchable portion 79a at the region of the upper attaching margin 77. The venting groove 89 may be positioned intermediate the attaching margin 77 and the margin of the inflatable tube 82 or may be positioned adjacent the attaching margin 77, and the venting groove 89 extends, desirably, along a spanwise rectilinear line at corresponding chordwise positions. For some applications a second spanwise venting groove may be provided in the lower stretchable portion 79b at the region of the lower attaching margin 78 which second groove may be of a construction like the groove 89.

The venting groove 89 extends between the ends of the covering 75 and terminates at rib elements disposed inwardly of these ends, as shown especially in Figs. 11 and 12. Apertures or venting holes 94 extending through the covering at the reinforcing tapes 88 are provided in the venting groove 89 along a spanwise line at corresponding chordwise positions for communication of the venting groove and the venting channels with the outer air pressures. These venting holes are disposed in each tape 88, but may be disposed, for example, in alternate tapes or only in the respective tapes at the ends of the covering 75.

In the operation of the protective covering 75 subsequent to the inflation and deflation of the tubes 82, 83, 84, the outer air pressures are transmitted through the venting holes 94 and then spanwise along the venting groove 89. Since the chordwise venting channels 81a are in communication with the spanwise venting groove, the air pressures along the groove are transmitted along the venting channels promoting equalization of the air pressures under the covering with respect to the outer air pressures, thus preventing objectionable bulging of the covering 75. Changes in flight conditions of the airfoil alter the outer air pressures over the covering thereby causing air to be aspirated through the venting holes which action alters rapidly the air pressures existing under the covering to conform to the changed outer air pressures by virtue of the intercommunication of the holes, venting groove, and venting channels.

An alternative arrangement of the covering 75 is shown in Fig. 14, in which arrangement a spanwise-extending venting groove 89a is adjacent the upper attaching margin 77 and is open to the outer air pressures at the ends of the covering for providing for venting the groove 89a and the venting channels 81a in communication therewith. It is preferable here for best venting action that no venting holes be provided at the respective reinforcing tapes, the openings of the venting groove 89a at the ends of the covering being utilized for this purpose. However, for some applications, venting holes at the tapes may be desirable for supplementing the end venting of the groove 89a.

Variations may be made without departing from the scope of the invention as it is defined in the following claims.

We claim:

1. A protective covering for preventing accumulation of ice upon a structure in a flow of air under ice-forming conditions across the covering, said covering comprising flexible material and including means for distorting the outer face of the covering and a corrugated surface beneath said outer face, said surface being movable relative to said structure under the distortion and having a multiplicity of lands in side-by-side and spaced-apart relation to one another defining channels in said surface, each channel being relatively small in cross-section as compared to its length, and a venting zone extending substantially unidirectionally in a direction in which a margin of the covering extends and being in communication with said flow of air, each said lands and channels extending to said zone with said channels in communication with said zone for venting air at said surface to the atmosphere.

2. A protective covering for preventing accumulation of ice upon a structure in a flow of air under ice-forming conditions across the covering, said covering comprising flexible material and including means for distorting the outer face of the covering and a multiplicity of consecutive and coextensive lands in side-by-side and spaced-apart relation to one another at the corrugated inner face of the covering for disposition against said structure, said inner face being movable relative to said structure under the distortion, said lands defining coextensive channels between said lands, each channel being coextensive with said lands and being relatively small in cross-section as compared to its length, and a venting groove extending substantially unidirectionally across said lands in a direction in which a margin of the covering extends and intersecting the lands of each said channels in communication with said groove, the latter being in communication with said flow of air for venting air at said face to the atmosphere.

3. A protective covering for preventing accumulation of ice upon an airfoil, said covering comprising resilient rubber-like material having an inner face for disposition against said airfoil and including an inflatable portion, a stretchable portion of said material between said inflatable portion and a margin of the covering, and means for inflating said inflatable portion, said stretchable portion at said inner face being uniformly corrugated in an imperforate area thereof bounded at opposite sides by rectilinear venting zones, each zone extending in a direction at an angle to said margin and being in communication with the outer air, said stretchable portion at said area having a multiplicity of uniformly spaced lands extending between said zones in the direction of said margin and defining a multiplicity of channels extending from venting zone to venting zone, each channel being in communication with said zones, and said stretchable portion at each of said channels being of lesser thickness than at each of said lands providing a multiplicity of regions of greater stretchability immediately at said channels than at said lands by virtue of the resiliency of said material whereby, under a condition of stretch, said stretchable portion at said regions of greater stretchability is stretched to a greater extent and is further reduced in thickness as compared to that at said lands thereby providing relatively extensive stretching and a depression in the outer surface of said stretchable portion at each of said regions of the covering for facilitating effective removal of ice deposited on such latter portion.

4. A protective covering for preventing accumulation of ice upon an airfoil in flow of air, said covering comprising flexible material at the outer face thereof and including a striated surface having an area beneath said outer face bounded by spanwise and chordwise sides, at least one of said sides being substantially straight, and said covering comprising means for distorting said outer face, said surface being movable relative to said airfoil under the distortion and having in said area a multiplicity of consecutive and spaced-apart coextensive lands in side-by-side relation extending to said straight side of said area and defining a multiplicity of coextensive venting channels of relatively great length as compared to their width between said lands such that said channels are in side-by-side relation separated by said coextensive lands throughout their extent.

5. A protective covering for preventing accumulation of ice upon an airfoil in flow of air, said covering comprising flexible material at the outer face thereof and including a surface having a generally rectangular and striated area beneath said outer face bounded by spanwise and chordwise sides, and said covering comprising means for distorting said outer face, said surface being movable relative to said airfoil under the distortion and having in said area a multiplicity of consecutive and substantially uniformly spaced-apart coextensive lands in side-by-side relation extending in a spanwise direction generally parallel with a spanwise side of said area to a chordwise side of the latter and defining a multiplicity of coextensive venting channels of relatively great length as compared to their width extending spanwise between said lands to said chordwise side such that said channels are in side-by-side relation separated by said coextensive lands throughout their extent and are each substantially coextensive with said lands.

6. A protective covering for preventing accumulation of ice upon an airfoil in flow of air, said covering comprising flexible material at the outer face thereof and including a surface having a generally rectangular and striated area beneath said outer face bounded by spanwise and chordwise sides, and said covering comprising means for distorting said outer face, said surface being movable relative to said airfoil under the distortion and having in said area a multiplicity of consecutive and coextensive lands extending in a chordwise direction generally parallel with a chordwise side of said area to a spanwise side of the latter and defining a multiplicity of coextensive venting channels of relatively great length as compared to their width extending chordwise between said lands to said spanwise side such that said channels are in side-by-side relation separated by said coextensive lands throughout their extent.

7. A protective covering for an airfoil, said covering comprising flexible material and including a multiplicity of consecutive and substantially uniformly spaced-apart coextensive lands in an imperforate generally rectangular and corrugated area at the inner face of said covering for disposition against the airfoil, and means for distorting the outer face of said covering, said lands being movable relative to said airfoil under the distortion and defining a multiplicity of coextensive channels, said lands extending generally parallel with a margin of said area in side-by-side relation to one another, and said channels being open at another margin of said area for communication with low pressure air, each channel being relatively small in cross-section as compared to its length.

8. A protective covering for an airfoil, said covering comprising at its under surface chordwise-extending rectilinear venting zones for communication with low pressure air, said zones being spaced-apart spanwise of the covering and providing between them an imperforate area of said under surface, and a multiplicity of substantially uniformly spaced-apart lands on said under surface in side-by-side relation to one another and extending spanwise thereof in said imperforate area and terminating at said venting zones, providing a multiplicity of adjacent venting channels extending spanwise in side-by-side relation separated by said lands throughout their extent from zone to zone in communication with the zones and providing, by contact of said lands with the airfoil, total confinement of each of the spanwise channels except at the ends thereof communicating with the chordwise venting zones, each channel being of relatively great length as compared to its width.

9. A protective covering for an airfoil, said covering comprising at its under surface a chordwise-extending rectilinear venting zone intermediate the ends of said covering for communication with low pressure air, an imperforate area of said under surface between an end of the covering and said venting zone, and a multiplicity of substantially uniformly spaced-apart lands on said under surface in side-by-side relation to one another and extending spanwise thereof in said imperforate area from said venting zone to said end of the covering, providing a multiplicity of adjacent venting channels extending spanwise from said end in communication with said venting zone and being open at said end of the covering to the outer air and providing by contact of said lands with the airfoil, total confinement of each of said venting channels except at the end thereof communicating with the venting zone and at said end of the covering, each channel being of relatively great length as compared to its width.

10. A protective covering for preventing accumulation of ice upon an aircraft, said covering comprising resilient rubber-like material having an inner face for disposition against the aircraft, and inflatable means for distorting said covering, said covering having a multiplicity of spaced-apart coextensive rib elements in side-by-side relation to one another at said inner face and defining a multiplicity of spaced-apart coextensive channels, said rib elements and channels extending to an end of said covering and the channels being open at said end for promoting equalization of the air pressure along said channels with respect to the outer air pressure at said end of the covering, said channels having lengths many times their cross-sectional dimensions.

11. A protective covering for preventing accumulation of ice upon an airfoil, said covering comprising resilient rubber-like material having an inner face for disposition against the airfoil, and means for distorting the covering, said covering having a multiplicity of consecutive and spaced-apart coextensive rib elements in side-by-side relation to one another and extending spanwise of the covering at said inner face and defining a multiplicity of spaced-apart coextensive channels, said rib elements and channels terminating at a line extending in the direction in which an end of the covering extends, and said covering having a chordwise-extending rectilinear venting groove intermediate the ends of said covering and across said rib elements at said inner face for communication with low pressure air, said channels being open at said venting groove for promoting equalization of the air pressure along said channels with respect to the air pressure in said venting groove, and said channels having lengths many times their cross-sectional dimensions.

12. A protective covering for preventing accumulation of ice upon an airfoil, said covering comprising resilient rubber-like material having an inner face for disposition against the airfoil, and inflatable means for distorting the covering, said covering having a multiplicity of consecutive and substantially uniformly spaced-apart coextensive rib elements in side-by-side relation to one another and extending spanwise of the covering at said inner face and defining a multiplicity of spaced-apart coextensive channels, and said covering having spaced-apart chordwise-extending rectilinear venting grooves intermediate the ends of said covering and across said rib elements and channels at said inner surface, said venting grooves having apertures extending through said covering in communication with the outer air, said channels being coextensive with said ribbed elements and open at said venting grooves for promoting equalization of the air pressure along said channels with respect to the air pressure in said venting grooves, and said channels having lengths many times their cross-sectional dimensions.

13. A protective covering for preventing accumulation of ice upon an airfoil, said covering comprising a flexible structure of resilient rubber-like material having an inner face for disposition against the airfoil and including a distortable portion, inflatable means for distorting the same, and an adjacent stretchable portion, said structure having at said inner face a plurality of spaced-apart rectilinear venting grooves extending chordwise of the airfoil in the direction in which a margin of the covering extends and defining imperforate areas between said venting grooves at said stretchable portion, each of said venting grooves having an aperture extending through the covering in communication with the outer air, the apertures being disposed along a line spanwise of the airfoil at corresponding chordwise positions, and said structure having a multiplicity of substantially uniformly spaced-apart coextensive rib elements at said inner face extending spanwise thereof in said imperforate areas and terminating at said venting grooves, providing a multiplicity of adjacent spaced-apart coextensive channels extending spanwise from venting groove to venting groove in communication with said venting grooves, whereby equalization of the air pressure along said channels is promoted with respect to the air pressure at said apertures, and said channels having lengths many times their cross-sectional dimensions.

14. A protective covering for preventing accumulation of ice upon an airfoil, said covering comprising resilient rubber-like material having an inner face for disposition against the airfoil, and means for distorting the covering, said covering having a multiplicity of consecutive and spaced-apart lands in side-by-side relation extending chordwise of the covering at said inner face and defining a multiplicity of spaced-apart channels such that said channels are in side-by-side relation separated by said lands throughout their extent, and said covering having a spanwise-extending venting groove across said lands at said inner face for communication with low pressure air, said channels being open at said venting groove for promoting equalization of air pressure along the channels with respect to the air pressure in said venting groove and being relatively small in cross-section as compared to their lengths.

15. A protective covering for preventing accumulation of ice upon an airfoil, said covering comprising resilient rubber-like material having an inner face for disposition against the airfoil, and means for distorting the covering, said covering having a multiplicity of consecutive and spaced-apart coextensive rib elements extending chordwise of the covering at said inner face and terminating at the sides of said covering and defining a multiplicity of spaced-apart coextensive channels, and said covering having a venting groove intermediate the sides of said covering and extending spanwise across said rib elements intermediate the ends of said covering at said inner face, said venting groove having spaced-apart apertures extending through the covering in communication with the outer air, and said channels being open at said venting groove for promoting equalization of the air pressure along said channels with respect to the air pressure in said venting groove and being relatively small in cross-section as compared to their lengths.

16. A protective covering for an airfoil, said covering comprising resilient rubber-like material and including an imperforate and striated area at the under surface of said covering bounded by sides at least one of which extends substantially normal to and intersects another side, a multiplicity of consecutive lands in said area on said under surface extending generally parallel with a side and terminating at a side intersecting it, means for distorting the outer face of said covering, said lands being movable relative to said airfoil under the distortion and said lands defining a multiplicity of channels such that the latter are in side-by-side relation separated throughout their extent by said lands, and a unidirectional venting zone extending across said lands and intersecting the lands with said channels in communication with said zone for venting air at said area to the atmosphere, each channel being relatively small in cross-section as compared to its length.

17. A protective covering for an airfoil, said covering comprising resilient rubber-like material and including an imperforate and striated area at the under surface of said covering bounded by sides, at least one of said sides extending spanwise generally parallel with a spanwise margin of the covering and another of said sides extending chordwise generally parallel with a chordwise margin of said covering and intersecting the first said side, a multiplicity of consecutive lands in said area on said under surface extending generally parallel with the spanwise side of said area and terminating at the chordwise side of said area, means for distorting the outer face of said covering, said lands being movable relative to said airfoil under the distortion and said lands defining a multiplicity of channels such that the channels are in side-by-side relation separated by said lands throughout their extent, and a venting zone extending along said chordwise side of said area with said channels in communication with said zone for venting air at said area to the atmosphere, each channel being relatively small in cross-section as compared to its length.

WILLSON H. HUNTER.
WILLIAM C. GREEN.

REFERENCES CITED

The following references are of record in the file of this patent:

UNITED STATES PATENTS

| Number | Name | Date |
| --- | --- | --- |
| 2,168,328 | Diehl | Aug. 8, 1939 |
| 2,334,118 | Morse et al. | Nov. 9, 1943 |
| 2,200,838 | Field | May 14, 1940 |
| 2,168,012 | Waner | Aug. 1, 1939 |